US006917424B2

(12) United States Patent
Rodrigues et al.

(10) Patent No.: US 6,917,424 B2
(45) Date of Patent: Jul. 12, 2005

(54) PROCESS FOR MANUFACTURING PIGMENT DISPERSIONS

(75) Inventors: Allan Blase Joseph Rodrigues, Bloomfield, MI (US); Ken Stephen Schermacher, Chadds Ford, PA (US); Anthony Joseph Martino, West Chester, PA (US); Douglas E. Spahr, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 230 days.

(21) Appl. No.: 10/097,662

(22) Filed: Mar. 13, 2002

(65) Prior Publication Data

US 2002/0174804 A1 Nov. 28, 2002

Related U.S. Application Data

(60) Provisional application No. 60/227,007, filed on Mar. 23, 2000.

(51) Int. Cl.$^7$ ............................................. G01H 3/28
(52) U.S. Cl. ...................................... 356/326; 356/319
(58) Field of Search ............................... 356/319, 326, 356/402, 405, 334

(56) References Cited

U.S. PATENT DOCUMENTS

| | | | |
|---|---|---|---|
| 4,279,512 A | | 7/1981 | Tunstall |
| 4,403,866 A | | 9/1983 | Falcoff et al. |
| 4,511,251 A | | 4/1985 | Falcoff et al. |
| 4,692,481 A | * | 9/1987 | Kelly ......................... 523/219 |
| 4,887,217 A | | 12/1989 | Sherman et al. |
| 4,890,920 A | | 1/1990 | Niziolek et al. |
| 4,936,685 A | | 6/1990 | Taylor et al. |
| 5,022,758 A | * | 6/1991 | Schulz ....................... 356/319 |
| 6,288,783 B1 | | 9/2001 | Auad |

FOREIGN PATENT DOCUMENTS

| | | |
|---|---|---|
| BR | PI9800361-5 | 2/1998 |
| DE | 25 25 701 A1 | 12/1976 |
| DE | 240 075 A1 | 10/1986 |
| EP | 0 732 577 A2 | 9/1996 |
| FR | 2 594 131 A1 | 8/1987 |
| GB | 865 114 A | 4/1961 |
| GB | 1 589 705 | 5/1981 |
| SU | 364877 | 11/1973 |
| WO | WO 99/48602 A1 | 9/1999 |
| WO | WO 00/45152 A | 8/2000 |

OTHER PUBLICATIONS

ANONYMOUS, Colour measuring of wet coating compositions, Research Disclosure—Nov. 1991, RD 33196.

Spehl J. et al., Application of backpropagation nets for color recipe prediction as a nonlinear approximation problem, Jun. 27, 1994, 3336–3341, vol. 5.

International Search Report dated Oct. 21, 2002.

\* cited by examiner

*Primary Examiner*—Zandra V. Smith
(74) *Attorney, Agent, or Firm*—Steven C. Benjamin

(57) ABSTRACT

An improved process for making pigment dispersions containing a single pigment that match the tinting strength of a standard dispersion. The process employs a faster and more accurate wet measurement technique for analyzing and matching the dispersions to a standard that utilizes the spectral transmittance of the wet dispersions over the visible spectrum.

16 Claims, 1 Drawing Sheet

PROCESS FOR MANUFACTURING PIGMENT DISPERSIONS

CROSS-REFERENCE TO RELATED APPLICATION

This application claims priority under 35 U.S.C. §119 from U.S. Provisional Application Ser. No. 60/227,007 (filed Aug. 23, 2000), which is incorporated by reference herein for all purposes as if fully set forth.

BACKGROUND OF THE INVENTION

The invention relates to an improved process for making pigment dispersions that match a standard dispersion, using the spectral transmittance properties of the dispersions in the wet to rapidly analyze the dispersions as they are being made and bring them within an acceptable match to the standard.

Single pigment dispersions or mill bases are widely used nowadays in formulating pigmented finishes, such as exterior paints for automobiles and trucks. Such dispersions are typically prepared in a milling or grinding process where the solid pigment particles are ground in the presence of solvent and polymer dispersant until a stable particle dispersion with the desired degree of fineness is formed.

It is important to carefully control these pigment dispersions with regard to tinting strength and color through particle size adjustments as they are being made, so that when they are used in specified proportions to produce a desired paint, the load color of the paint is easily shadeable/adjustable to an acceptable match to the standard color for the paint.

One difficulty, however, is that commonly used indicators of particle size, such as gloss, Hegman Gage or conventional particle size measurement, are either indirect, inaccurate or time consuming. In addition, there are no convenient methods to test tinting strength and color of neat dispersions during the milling or grinding process. Thus, acceptability of the grind is nowadays determined through traditional strength testing, which is a manual process that involves blending the dispersion with a standard white or black paint, spraying the blend onto panels, baking the panels and then comparing the panels to those of a standard batch of that dispersion blended with the same standard white or black using a spectrophotometer or calorimeter. Lightness differences between the dry sprayouts are then used as an indication of strength and acceptability of the grind.

Traditional strength testing is cumbersome and very time-consuming and the accuracy of the test is also dependent on the color and strength stability of the standard white or black paints. Even with careful control, these standards can vary from batch to batch and tend to flocculate or settle in time, leading to poor test repeatability and difficulty in accurately matching the dispersion being made to a standard dispersion. Additionally, there is inherent variability in the dry sample preparation process which also leads to inaccuracy in color determination.

Tinting strength of a dispersion is a function of both pigment particle size distribution and pigment concentration. While the traditional test indicates strength, it is unable to separate the effects of pigment concentration from particle size distribution. Thus it is impossible to determine when optimum pigment particle size has been obtained, which information could beneficially serve to minimize the amount of pigment to be used, since pigment is typically the most expensive ingredient in the paint. Lastly, the traditional test gives no indication of color changes arising from batch-to-batch pigment variability. Even when strength may equal that of the standard, the dispersion may be calorimetrically unacceptable for use in paints where it is the prime dispersion.

Therefore, there is a need for a faster and more accurate process for analyzing pigment dispersions as they are being made, that can fully characterize the properties of the dispersion and determine the end-point of the grinding process, without requiring blending and spraying with white or black standards and the production of dry samples during the manufacturing process.

SUMMARY OF THE INVENTION

The invention provides an improved process for making a pigmented dispersion that matches a standard liquid dispersion. The process utilizes a novel wet measurement technique which measures the spectral transmittance of the wet dispersion over the visible spectrum and determines therefrom the tinting strength of the dispersion and whether additional grinding is needed to bring the dispersion within an acceptable strength tolerance, thus allowing for precision tinting strength matching and better pigment utilization, while also indicating color acceptability. The invention also provides the ability to obtain particle size, strength and color all in a single measurement. Elimination of sprayouts of the dispersion batch being tested also results in significant time savings in the dispersion manufacturing process.

The process of this invention is particularly useful in the production of dispersions for high performance automotive coatings and, in particular, exterior coatings for automobiles and trucks, but can also find use in the manufacture of other types of paints, printing inks, ink jet inks and other colored products using pigment dispersions.

The improved process for making single pigmented dispersions involves the following:

(a) charging the components of a single pigment liquid dispersion into a mixing vessel;

(b) grinding the components together to form a liquid dispersion;

(c) passing the liquid dispersion through a transmittance cell, preferably of controlled pathlength, coupled to a spectrophotometer;

(d) measuring the spectral transmittance of the wet dispersion over the visible spectrum;

(e) calculating the optical density of the dispersion at two specific wavelengths from the transmittance measurements and comparing the ratio of optical density values at the two specific wavelengths to that of a known standard dispersion to determine achievement of the desired particle size and thus the desired tinting strength;

(f) repeating steps (b)–(e) at least once in the event the dispersion is not within the desired particle size tolerance until the dispersion being manufactured is within said desired particle size tolerance;

Once the desired particle size and strength have been achieved, the process may further include the following:

(g) comparing the optical density value at a selected wavelength to that of a known standard of equivalent particle size to determine pigment concentration of the dispersion and its relative tinting strength as compared to a standard.

Alternately, the pigment concentration can be determined by comparing the absorbance or transmittance spectrum of the dispersion with that of a known sample, either by integration (e.g., $L^*$) or by fitting (e.g., by the least squares method).

Additionally, once the pigment concentration and relative strength have been determined, the process may also include the following:

(h) analyzing the spectral transmittance of the resulting dispersion to determine color acceptability for use in finished paints where this dispersion is the prime dispersion or a significant component thereof, thus fully characterizing the dispersion.

In a preferred embodiment, the invention utilizes a computer to perform the necessary calculations. In another embodiment, where dispersion color is the primary determinant of the end-point of the grind, steps (e)–(g) can be skipped, and steps (b)–(h) are repeated until the desired color is achieved. In yet another embodiment, the invention provides an automated, computer controlled batch or continuous process for making pigment dispersions which utilizes on-line testing of the dispersions.

DETAILED DESCRIPTION OF THE INVENTION

Figure 1:
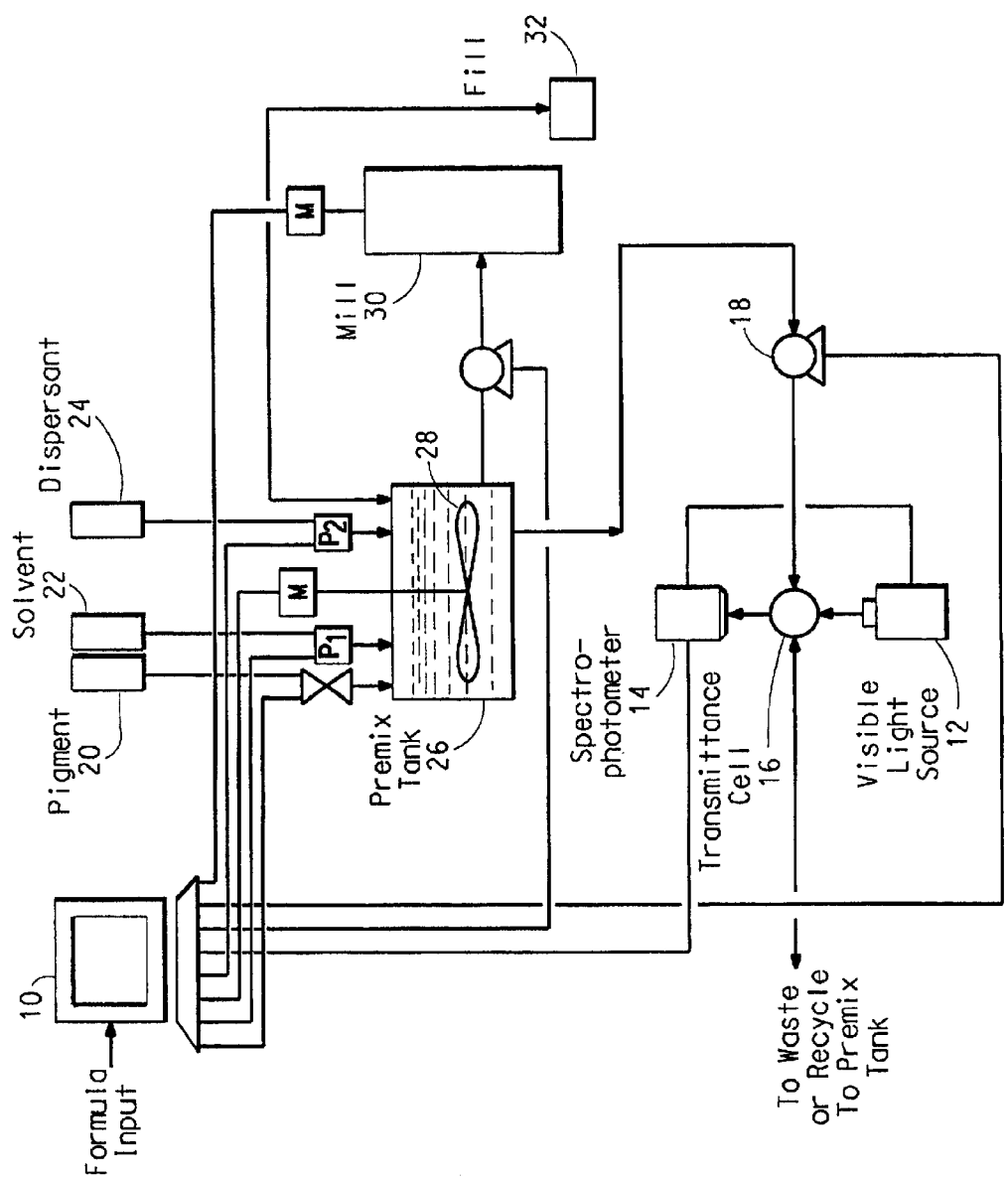
FIG. 1 shows a schematic diagram of the process of the invention used to make single pigment dispersions that match a standard dispersion within acceptable tolerances, and also demonstrates the possibility of having an on-line color and strength measuring system.

The process of this invention produces a dispersion having a tinting strength that accurately matches the strength of a standard dispersion, while also indicating color acceptability, through the use of only wet spectral transmittance readings of the dispersion over the visible spectrum. This makes the dispersion preparation process faster and more accurate, significantly reduces the time it takes to analyze and adjust the dispersion properties, and eliminates the need for blending and spraying with standard white or black bases as well as the preparation of a number of dry samples during the manufacturing process. It also enables on-line testing of the dispersions and automated dispersion manufacture in batch or continuous mode.

In the preferred process of this invention, a computer is used to facilitate the required calculations. Although less preferred, calculations can be done by hand. The spectrophotometer that is used to take the spectral readings can be any commercially available unit capable of measuring the spectral transmittance over the visible spectrum of the wet dispersion being manufactured and generating spectral transmittance curves and L*, a* and b* or other suitable color values for the dispersion.

Referring now to FIG. 1, when the process of this invention involves the use of a computer 10, the permissible pigment particle size tolerance (i.e., the allowable variation from standard) for the dispersion being produced is fed into the computer. An index of the average pigment particle size, the pigment concentration, the spectral transmittance curve over the visible spectrum and L*, a* and b* or other suitable color values for the standard liquid dispersion which the dispersion being produced is to match is also fed into the computer. This index can be developed either by measuring an available wet sample of the standard dispersion or by retrieving stored data from previous such measurements.

The spectrophotometer 12 utilized in the process, which is coupled to a visible light source 14, is either positioned at a remote location from the dispersion unit for off-line testing or connected to the dispersion unit for on-line testing of the wet dispersion. As shown in FIG. 1, in the preferred process of the invention, the wet dispersion is simply transferred directly to a transmittance cell 16 coupled to the spectrophotometer and light source for spectral measurement. Allowing the dispersion to flow through the cell directly from the dispersion unit, for example, via pump 18, allows for on-line or continuous dispersion testing and enables automated batch or continuous dispersion manufacture.

In the preferred process of this invention, the components used to make the single pigment dispersion, i.e., pigment 20, polymer dispersant 22, and solvent 24 and optional other additives, are metered into a pre-mixing vessel 26 containing a mixer 28 having a mixing blade attached to a shaft and driven by a motor. The pre-mixing vessel feeds this pre-mix to any commercially available dispersion unit 30 that is capable of carrying out pigment particle size reduction. Suitable dispersion devices that are traditionally used for wet grinding include horizontal mills, ball mills, vertical mills, attritors, vibratory mills and the like, containing various grinding media. Suitable grinding media include sand, glass beads, ceramic beads, metal beads and the like. Non-media mills can also be used, such as high shear dispersers and the like. It is preferred to use a dispersion unit that is controlled by a computer.

The components are then thoroughly ground together to form a liquid dispersion and then passed through the transmittance cell 16 coupled to the spectrophotometer 12 and light source 14 for measurement. The cell 16 has viewing windows which are transparent to the visible light spectrum and usually made of materials such as quartz glass, borosilicate glass, fused silica, sapphire glass, etc. In the preferred process of this invention, dispersion flow through the cell is set sufficiently high to provide a constant interface that can be measured by the spectrophotometer and to prevent build-up of deposits on the cell windows. This improves measurement accuracy and also retards settling or flocculation of the pigment in the dispersion. In some cases, where deposits on the glass interface and settling of pigments are not of concern, transmittance can be advantageously measured in a static sample without flow.

Pathlength of the light through the sample is set low enough to allow sufficient light throughput to be accurately measured by the instrument detectors, yet high enough to avoid saturation of the detectors. Pathlengths are typically set between 10–250 microns, preferably 20–75 microns. However, for some optically dense dispersions, dilution may be necessary to obtain full spectral information.

The spectrophotometer used in the process is preferably electrically connected to a computer 10 and preferably measures the transmittance of the wet dispersion being prepared over the visible spectrum, generates the spectral transmittance curve for the dispersion, and feeds this data back to the computer. Typically the spectrophotometer will take spectral transmittance measurements and determine the spectral curve of the dispersion through the visible spectrum of 400–700 nanometers (nm) at 10 nm increments.

The computer then takes this data and calculates the optical density of the dispersion at two specific wavelengths, preferably the wavelengths of maximum and minimum optical density. As indicated below, alternate wavelengths may be chosen in certain circumstances to provide more accurate measurements. Optical density for a given wavelength can be calculated from Beer's law according to the formula:

Optical Density $(OD) = \log(1/T) = cKt$ where T=transmittance
c=pigment concentration
K=absorption coefficient
t=optical pathlength (thickness of film)

Beer's Law is obeyed very well in the absence of any light scattering by the pigment particles. Additionally, the concept of this invention still holds in the presence of light scattering. Pathlength may have to be reduced or the sample diluted (e.g., with clear polymer and solvent) in order to transmit sufficient light through the sample to provide an accurate measurement. The invention therefore allows for measurement of transparent pigment dispersions as well as opaque dispersions having higher levels of light scattering.

Transparent dispersions, as they are commonly referred to in the art, typically contain pigments with very small particle sizes (typically less than 0.4 micron) and are widely used in formulating special effect coatings, such as metallic or pearlescent basecoats for automobile and truck exteriors. Opaque or solid color dispersions, on the other hand, contain larger pigment particles and are widely used in formulating solid color coatings for automobile and truck exteriors.

After the optical densities are calculated at the two specific wavelengths, the ratio of the optical densities at the two selected wavelengths is compared to that of the known standard dispersion. The difference between the optical density ratio of the dispersion being prepared and the tolerance values for the standard dispersion is then used to determine achievement of the desired particle size and related desired strength. The ratio of these two optical densities is a measure of average pigment particle size and thus related to tinting strength, thereby allowing for a determination of the end-point of the grinding process.

This ratio is most sensitive if the wavelengths of maximum and minimum optical density are chosen. In some cases, other wavelengths may be more practical. For example, with highly absorbing pigments, the light transmittance at maximum absorption (also the maximum optical density) may be too low to get an accurate reading. An alternate wavelength may then be chosen at which transmittance is sufficiently high to provide confidence in the accuracy of the reading.

With the above information, a determination is made as to whether additional grinding is needed to bring the dispersion within the particle size tolerance and thus strength tolerance for the dispersion. The above procedure is repeated until the dispersion being prepared is within the desired particle size tolerance. Once the desired particle size tolerance is achieved, the dispersion unit is halted so that no more grinding is effected.

The process of this invention also can be used to indicate whether the desired tinting strength from the pigment has been achieved. Even when pigment particle size distribution is within prescribed tolerances, the desired tinting strength may not be achieved from the dispersion due to discrepancies in pigment concentration. To accomplish this determination, after the dispersion has reached the desired optical density ratio tolerance, the optical density value at a selected wavelength is compared to that of a known standard to determine pigment concentration of the dispersion, calculated from Beer's law, and its relative tinting strength as compared to a standard, thus fully characterizing the dispersion strength.

A variation of the process for determining acceptability of pigment concentration is to look at the lightness (L*) calculated from the spectral transmittance curve. Concentration differences can then de determined from this using Beer's Law applied to all wavelengths, or theories such as Kubelka-Munk, widely used in color calculations when light scattering is present.

As a further alternative, the pigment concentration can be determined by fitting (e.g. by the least squares method) the measured absorbance or transmittance spectrum at selected or at all wavelengths with a standard spectrum taken on a sample of known concentration.

Additionally, once the pigment concentration and relative strength have been determined, the process may also include analyzing the spectral transmittance of the resulting dispersion to determine color acceptability for use in finished paints where this dispersion in the prime dispersion or a significant component thereof. Even when strength may equal that of the standard, the dispersion may be calorimetrically unacceptable for use, due to batch-to-batch pigment variability. The process of this invention has the ability to monitor these color changes and indicate whether the color is acceptable for use. The spectral transmittance of the resulting dispersion is measured by the spectrophotometer and the L*, a* and b* color values of the dispersion are then calculated from these measurements. The computer takes these L*, a* and b* values and determines the difference between the L*, a* and b* values for the standard dispersion and from the magnitude of the numbers, determines the color acceptability of the dispersion. A variation is to calculate color differences from the standard by converting L*, a*, b* differences to differences in lightness, hue and chroma, either as commonly used in the CIE76 equations or modifications such as CMC or CIE94. The process of achieving equal optical density ratios between batch and standard and correcting for lightness differences still does not address hue shifts due to batch-to-batch pigment variations. A determination of hue difference ($\Delta H^*$) as calculated by these equations allows setting of a tolerance on hue acceptability. Wet color tolerances are set to meet the final enduse needs.

For some pigments, color is the most critical determinant of dispersion quality. In these cases, the abovementioned steps to determine particle size, concentration and relative strength can be avoided, and the grind/color test cycle repeated until the desired dispersion color is achieved.

Referring again to FIG. 1, after the dispersion is prepared and all the measurements are taken, it can be filled into suitable containers 32 either automatically or manually by using conventional filling equipment and procedures.

An overall schematic of an automated dispersion manufacturing plant, using on-line wet color and strength testing and end-point determination according to the present invention is shown in FIG. 1.

The high quality dispersions produced by the process of this invention are particularly useful in formulating high performance coating compositions and in particular colorcoat or basecoat compositions for clearcoat/colorcoat finishes for automobile and truck exteriors. The invention, however, may also be used for measurement and control of pigment dispersions used in formulating any colored product using dispersions, such as other types of paints, printing inks, ink jet inks, color concentrates and the like.

A variation of this invention, although less desired, is to use the same process with spectral transmittance measurements on precision coatings, drawdowns or sprayouts of the dispersions over a transparent substrate such as Mylar® film.

The following Examples illustrate the invention.

EXAMPLES

Example 1

The process described above was operated in off-line mode to characterize a single-pigment green dispersion. The dispersion was produced by grinding a mixture of green pigment, polymeric dispersant and solvent in a sand mill in a pass-to-pass operation. The batch was purposely ground for extra passes to provide samples on either side of the standard dispersion. Batch samples were taken after the $2^{nd}$, $3^{rd}$, $4^{th}$ and $5^{th}$ passes and tested for particle size.

In the dry test, dry drawdowns of the neat samples were used for transparency comparisons to the standard dispersions. In the wet test, the ratios of optical density (O.D.) at 530 nm and 560 nm were measured on neat liquid dispersions samples. 530 nm was chosen because it was the wavelength of peak transmittance, while 560 nm, although not the point of maximum absorbance, was selected because it provided an accurate high absorbance data point. For the wet transmittance measurements, optical pathlength was set at 38 microns to provide the desired flow rate for measurement consistency and cleaning.

Dry transparency and wet optical density ratios were measured as follows:

|  | Dry Transparency | Wet O.D.(530 nm)/O.D.(560 nm) |
|---|---|---|
| Standard Dispersions | 100% | 0.516 |
| $2^{nd}$ Pass | 97.4% | 0.543 |
| $3^{rd}$ Pass | 102.7% | 0.488 |
| $4^{th}$ Pass | 103.6% | 0.476 |
| $5^{th}$ Pass | 104.6% | 0.472 |

The wet O.D. ratios matched the dry transparencies very well. When compared to the standard dispersion, the wet measurements would have indicated that grinding was sufficiently complete after the $3^{rd}$ pass.

Example 2

The dispersion samples from Example 1 above were tested for tinting strength, using dry and wet techniques. Dry results were gathered using the traditional method of mixing the dispersion with a white paint, spraying onto panels, baking the panels and measuring the lightness values (L*) of the dry panels versus a standard. Wet optical density measurements were taken as described in Example 1.

|  | Dry ΔL* | Wet O.D.(530 nm)/O.D.(560 nm) |
|---|---|---|
| Standard Dispersion | 0.00 | 0.516 |
| $2^{nd}$ Pass | 0.30 | 0.543 |
| $3^{rd}$ Pass | −0.16 | 0.488 |
| $4^{th}$ Pass | −0.16 | 0.476 |
| $5^{th}$ Pass | −0.28 | 0.472 |

The wet O.D. ratios corresponded well to the dry tinting strength measurements, indicating the effectiveness of the wet method in predicting strength. The wet measurements also showed the expected increase in strength between the $3^{rd}$ and $4^{th}$ passes, while the dry test did not. When compared to the standard dispersion, the wet measurements would have indicated that strength was sufficiently developed after the $3^{rd}$ pass.

Example 3

The dispersion samples from Example 1 above were diluted with a clear binder/solvent blend at a ratio of 33 grams of clear per 100 grams of dispersion. The diluted samples were then measured in wet transmittance as described above and the optical density ratios calculated at the selected wavelengths of 530 nm and 560 nm. In addition, optical densities of the neat samples were compared to those of the diluted samples at peak transmittance to determine whether Beer's law held over this concentration range.

The wet optical density ratios were measured as follows:

|  | Dilute O.D.(530 nm)/ O.D.(560 nm) | Neat O.D.(530 nm)/ O.D.(560 nm) | Neat/Dilute O.D. @ 530 nm |
|---|---|---|---|
| $2^{nd}$ Pass | 0.543 | 0.543 | 1.34 |
| $3^{rd}$ Pass | 0.492 | 0.488 | 1.34 |
| $4^{th}$ Pass | 0.480 | 0.476 | 1.33 |
| $5^{th}$ Pass | 0.470 | 0.472 | 1.33 |

The data show that, within measurement error, the O.D. ratios indicating particle size do not change over a significant concentration range, and that O.D. at peak transmittance provides an accurate measure of relative concentration. Thus, by using wet transmittance measurements, the effects of particle size and concentration can be separated when determining the strength of a dispersion.

What is claimed is:

1. A process for making single pigmented dispersions which comprises:
   (a) charging the components of a single pigment liquid dispersion into a mixing vessel;
   (b) grinding the components together to form a liquid dispersion;
   (c) passing the liquid dispersion through a transmittance cell coupled to a spectrophotometer;
   (d) measuring the spectral transmittance of the wet dispersion over the visible spectrum;
   (e) calculating the optical density of the dispersion at two specific wavelengths from the transmittance measurements and comparing the ratio of optical density values at the two specific wavelengths to that of a known standard dispersion to determine achievement of the desired particle size;
   (f) repeating steps (b)–(e) at least once in the event the dispersion is not within the desired particle size tolerance until the dispersion being manufactured is within said desired particle size tolerance; and
   (g) determining the pigment concentration of the dispersion and its relative tinting strength as compared to a standard by comparing the optical density value at a selected wavelength to that of a known standard of equivalent particle size, or by comparing the absorbance or transmittance spectrum of the dispersion with that of a known standard, either by integration or by fitting.

2. The process of claim 1, which further comprises:
   (h) analyzing the spectral transmittance of the resulting dispersion to determine color acceptability of this dispersion, thus fully characterizing the dispersion.

3. The process of claim 1, in which in step (c) the liquid dispersion is delivered directly from the dispersion unit to the transmittance cell.

4. The process of claim 1, in which the calculations are performed by a computer.

5. The process of claim 3, in which the process is automated.

6. The process of claim 1, in which the process is continuous.

7. The process of claim 1, in which the dispersion is a transparent dispersion.

8. The process of claim 1, in which the dispersion is an opaque dispersion.

9. Use of a dispersion made by the process of claim 1 in a paint.

10. Use of a dispersion made by the process of claim 1 in an ink jet ink.

11. The process of claim 1, in which the optical density in step (e) is calculated at the wavelengths of maximum and minimum absorption.

12. The process of claim 1, in which the optical density in step (e) is calculated at wavelengths of high absorption and minimum absorption.

13. The process of claim 1, in which in step (g) integration is used and it is carried out by the L* method.

14. The process of claim 1, in which in step (g) fitting is used and it is carried out by the least squares method.

15. The process of claim 2, in which in step (h) color acceptability is determined by use of standard color difference equations, taking the difference between the color of the dispersion as measured by its transmittance spectrum, and that of a known standard dispersion with a color acceptability within predetermined tolerances.

16. The process of claim 1, in which the process is used to determine the end-point of the grind.

* * * * *